A. G. HATCH.
REVERSING VALVE.
APPLICATION FILED JUNE 29, 1916.
1,222,624.
Patented Apr. 17, 1917.
3 SHEETS—SHEET 1.
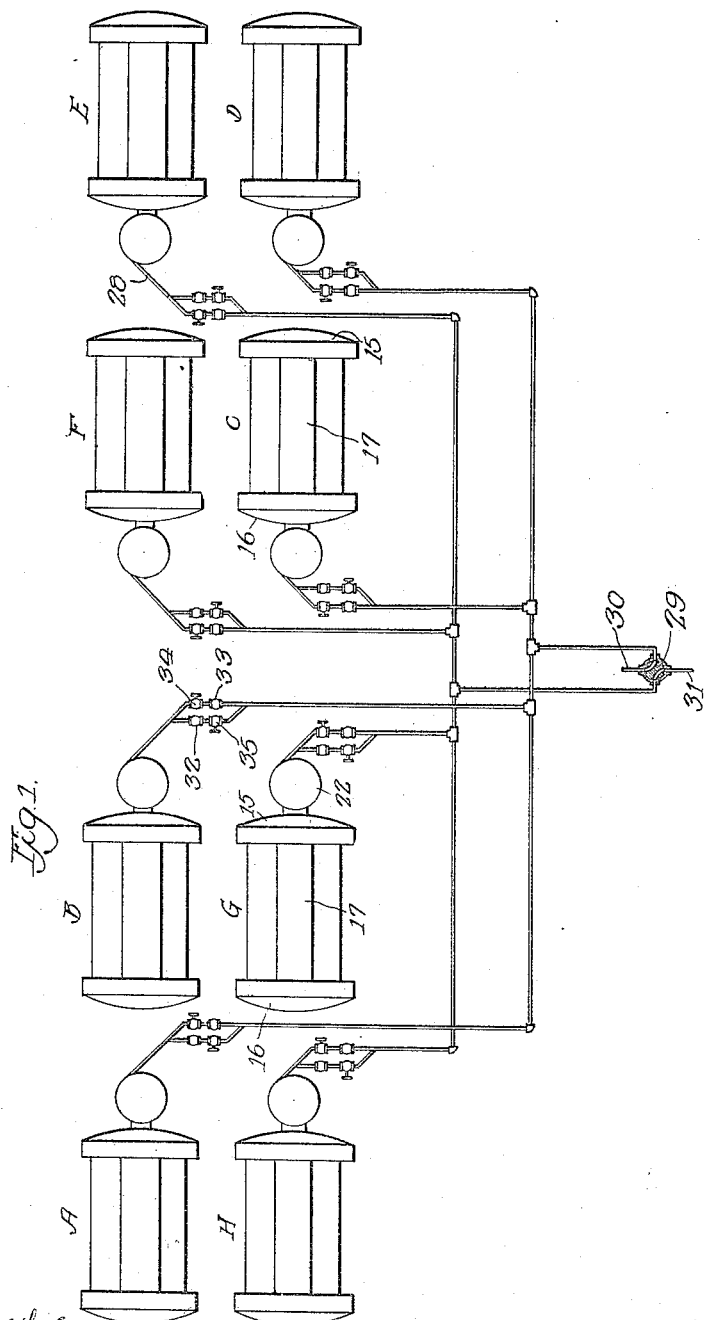
Witnesses:
C. H. Roessner.
C. J. Murray.
Inventor
Arthur G. Hatch
By [signature]
Atty.

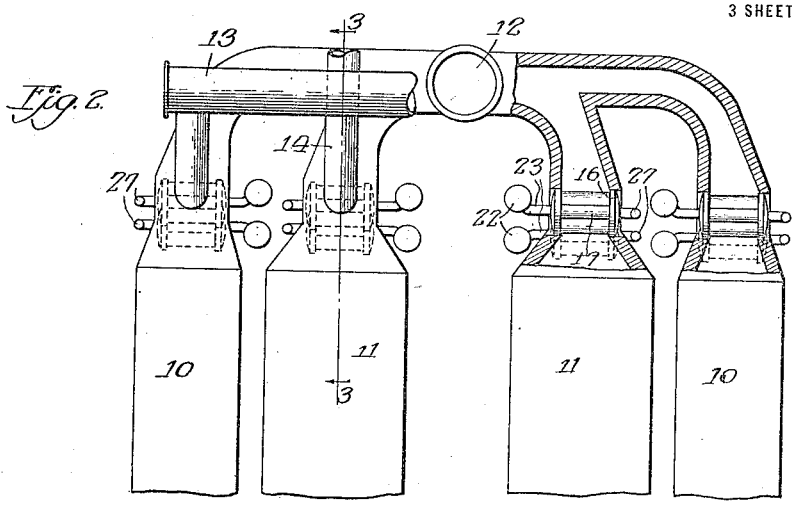
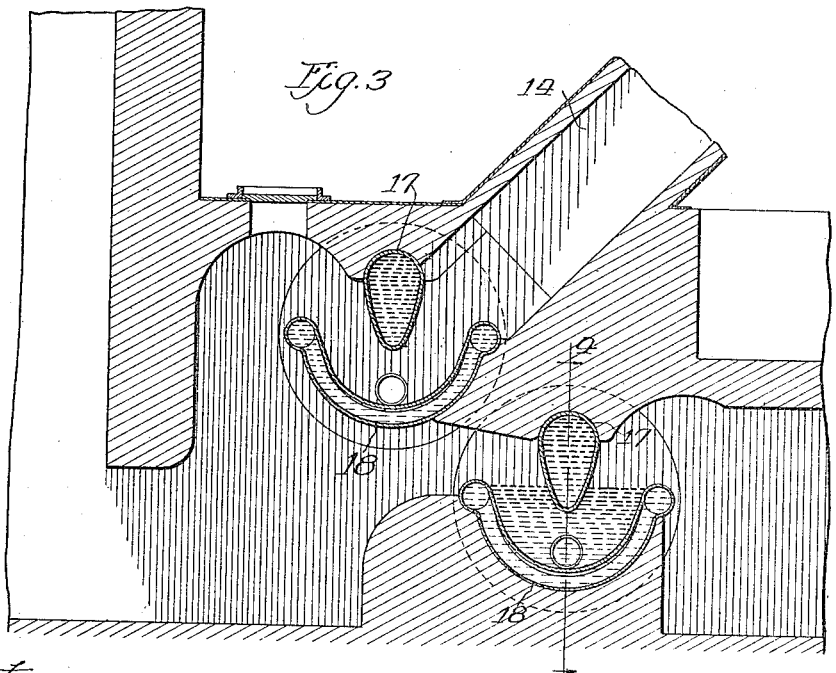

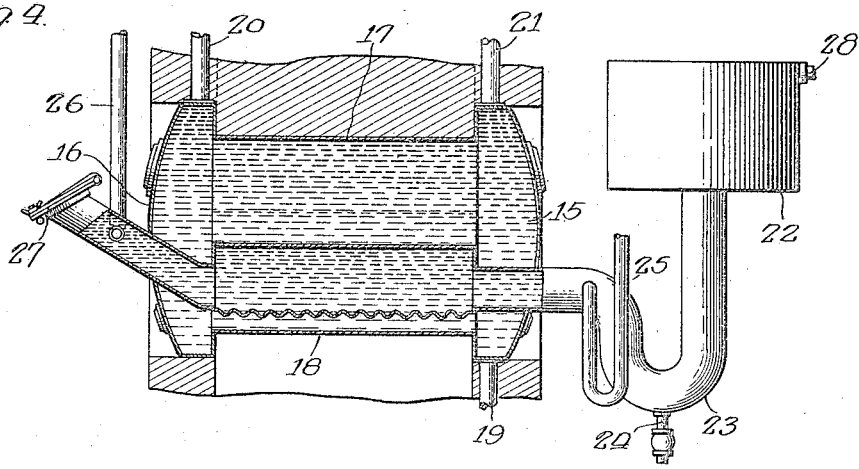
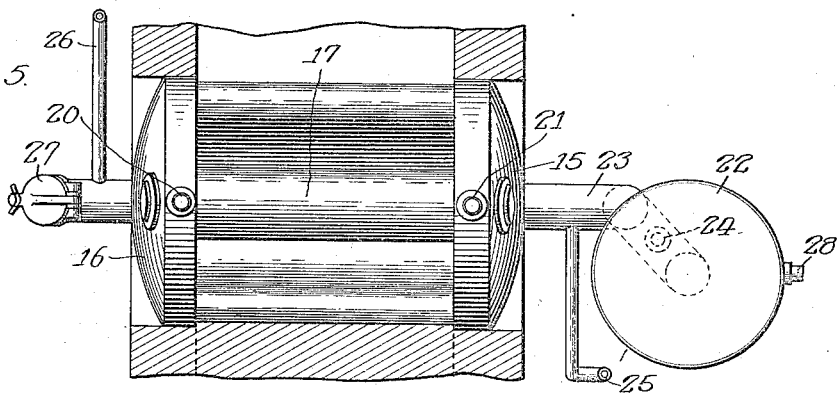
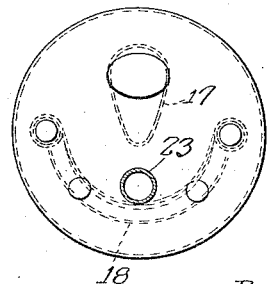

UNITED STATES PATENT OFFICE.

ARTHUR G. HATCH, OF DULUTH, MINNESOTA.

REVERSING-VALVE.

1,222,624. Specification of Letters Patent. Patented Apr. 17, 1917.

Application filed June 29, 1916. Serial No. 106,636.

*To all whom it may concern:*

Be it known that I, ARTHUR G. HATCH, a citizen of the United States, and resident of Duluth, in the county of St. Louis and State of Minnesota, have invented certain new and useful Improvements in Reversing-Valves, of which the following is a specification.

My invention comprises a reversing valve for use on regenerative furnaces, although it may be applied to other purposes. In general, it may be described as being of the "trap valve" type wherein the flow of gas is interrupted by filling a trough with water, said trough having across it a diaphragm, thus making a water seal to prevent the passage of gas. When it is desired to permit the gas to flow, the water is removed from the trough and the gas flows underneath the diaphragm. The peculiar features of my valve which differentiate it from all valves of this type are that I have incorporated no moving parts and accomplish the opening and the closing of the valve entirely by the displacement of the body of water. Furthermore, the design of my valve is such that it may serve the purpose of a waste heat boiler, or a feed water heater, it being so constructed that it contains at all times a large body of water independent of that body of water which is used to make and break the seal. In addition, the means I use for causing the displacement and replacement of the body of water to open or close the valve are distinctly novel.

Another advantage of my peculiar construction is that when applied to open hearth furnaces my valves have no projecting portions extending above the floor level. This is an important feature inasmuch as space at the ends of the regenerative chambers on an open hearth furnace is limited and mechanism or moving parts in this space are distinctly objectionable for operating reasons.

Another distinct advantage of my valve is that the passageway for the gas is not obstructed to the degree that valves of all previous types obstruct the flow.

It is well known that in operating reversing valves on furnaces there is a danger of throwing air and gas together and causing an explosion. It is important that the operation of reversing the valves be timed so that this shall not occur. With my construction all eight valves can be operated by one master valve, so arranged that each valve shall be caused to open or close at the right time.

The invention will be more readily understood by reference to the accompanying drawings, wherein—

Figure 1 is a diagrammatic view of the arrangement for reversing a regenerative furnace in which both the gas and air are regenerated and intended as an illustration of the means whereby all of the valves may be reversed at the same time;

Fig. 2 is a plan view, partly in section, showing a reversing valve arrangement;

Fig. 3 is an enlarged vertical section on the line 3—3 of Fig. 2;

Fig. 4 is a vertical section on the line 4—4 of Fig. 3;

Fig. 5 is a plan view of the reversing valve, and

Fig. 6 is an end view thereof.

Referring to Fig. 2, it will be seen that I have illustrated gas regenerators 10, and air regenerators 11. Inasmuch as the valves and their operating means are duplicated, a description of one thereof will suffice. The valves are located at the inlet and outlet ports of the regenerators, the connections between the regenerators and the furnace not being shown. Each of the regenerators is provided with a connection to the furnace stack 12, as best shown in Fig. 2. The gas regenerators are connected to a gas main 13, while the air regenerators are in communication with the atmosphere by means of the pipe 14. The two valves which are necessary to control one regenerator, such as the regenerator 11 shown in Fig. 2, are shown in Fig. 3. In that figure the lower valve which controls the exit to the stack is closed, while the upper valve, which controls the entrance of air to the conduit 14 is open. The particular advantage in the use of a construction such as herein illustrated is in that the reversing operation is accomplished for all the valves by merely operating a single moving part; that is, a four-way valve. The desirable result is accomplished by reason of the construction illustrated and which I will now proceed to describe.

The valve, as best shown in Figs. 4 and 5, comprises two heads 15, 16, connected by a hollow diaphragm 17 and a hollow semi-circular trough 18. Water is supplied to the container by means of an inlet pipe 19. Inasmuch as the water has no function other than that of cooling, there is no reason why the heat accumulated thereby should not be utilized. To this end I provide outlet pipes 20, 21, at the tops of the heads 16, 15, respectively, these outlets being provided at the extreme top of the heads in order to obviate the possibility of trapping steam. The water in this container is not utilized in the reversing action of the valve and may be used as a feed water heater, or for the production of steam.

I am aware that a trough having a transverse diaphragm and means for filling and emptying the trough above the bottom edge of the diaphragm has already been proposed, but I have invented a unitary structure adapted to withstand internal pressure and closed to the atmosphere, and the essential features of this new and novel structure are claimed herein.

By reason of the construction described, a trough is provided within which the diaphragm extends and beneath which diaphragm an ample space is provided for the passage of gases when water is not present in the trough. However, when water is admitted to the trough, as is shown in the lower portion of the view of Fig. 3, it will be seen that the passage of gases is prevented. As a means for accomplishing the ready displacement and supply of water to the trough 18, Fig. 4, as required to reverse the valve, I provide the tank 22, which is connected by a trap 23 to the trough 18. A drain pipe 24 is provided at the bottom of the trap. A trap pipe 25 is arranged with its upper end in such relation as to provide for the overflow of the water as it reaches the proper height in the trough. Inasmuch as some water will be lost by evaporation, water may be supplied continuously or as required through the pipe 26. Inasmuch as the gases which pass through this valve contain much solid matter, more or less of which will be deposited in the trough I provide a handhole 27, by means of which the trough may be cleaned.

It will be noted that the tank 22 is located somewhat above the level of the water in the trough, the intention being to cause the water to be elevated into the tank by suction and to be retained therein while the valve is open. When the valves are to be reversed and water is to be supplied to the trough, the vacuum may be released and the water allowed to flow by gravity into the trough from the tank 22. As a means for accomplishing this result simultaneously in all of the valves, I provide a connection 28 to the tank, these connections terminating in a four-way master valve 29, best shown in Fig. 1. The pipe 30 connects with a source of suction, while the pipe 31 is open to the atmosphere. It will be seen, therefore, that because of the fact that valves A, B, C and D are in communication with the suction pipe 30 that they are open; that is, that the water intended to seal the valve is in the tank 22, whereas valves E, F, G and H are closed, due to the fact that the connections to the tank 22 are open to the atmosphere, which permits the water in the tank to fall by gravity into the trough. It will be seen, therefore, that by manipulating the four-way valve 29, the valves may be reversed.

Inasmuch as all the valves should be reversed at the same time, or at least as the time of operation of the valves should be controlled exactly, I provide means for accomplishing that end, comprising the check and needle valves shown in the drawings. Connected to each of the tanks in the line 28 therefrom are check valves 32, 33, and needle valves 34, 35. The check valves are oppositely disposed, to the end that air pressure may be controlled in both directions and a different speed or degree of celerity provided for; that is to say, it may be desirable that the water in the tank 22 be withdrawn quickly and allowed to return slowly. This is accomplished by the adjustment of the needle valves 34, 35, each of which will act independently of the other, due to the insertion of the check valves in the line.

While I have referred to the device as employing suction and have shown the tank as located above the level of the valve, it will be understood that the tank might be located below the level of the valve and compressed air be employed instead of suction. Of course, the operation would be the same, as the water would be displaced by pressure in one direction and allowed to return by gravity in the other direction.

Obviously other modifications may be made in the construction shown, and such modifications as are within the scope of my claims I consider within the spirit of my invention.

I claim:

1. In a reversing system for regenerative furnaces, the combination of a plurality of valves, each including a trough adapted to contain water, a separate water container or tank connected to each trough, the trough and tank being permanently located at different elevations, means for changing the pressure in said tanks, and a valve adapted to alternately connect certain of said tanks to said pressure changing means and the remainder of said tanks to the atmosphere.

2. In a reversing valve, the combination of hollow end members, a hollow trough and a hollow diaphragm connecting said end members, means for supplying water to said trough, said means including a stationary tank located above said trough and means for alternately exhausting the pressure in said tank and connecting the same to the atmosphere, whereby the water in said tank is caused to occupy said trough and to be displaced therefrom, substantially as described.

3. In a reversing system for regenerative furnaces, the combination of a plurality of valves, each including a trough adapted to contain water, a water container or tank connected to each trough, means for changing the pressure in said tanks, a valve for simultaneously connecting certain of said tanks to said pressure-changing means and the remainder of said tanks to the atmosphere, and means between each tank and said valve for controlling the size of the passage for each direction of flow of the fluid in said passage, substantially as described.

4. In a reversing valve, the combination of a trough adapted to contain water, a tank located at a different level from said trough, means for changing pressure conditions in said tank, whereby water is caused to flow from said tank into said trough and from said trough into said tank, said means including a pressure-changing device and means in the line between said tank and said pressure-changing device including a by-pass, check valves in said line and in said by-pass and needle valves also in said line and said by-pass, substantially as described.

5. In a reversing valve, the combination of a pair of hollow heads, a hollow diaphragm connecting said heads, a hollow trough connecting said heads, said diaphragm projecting into said trough, a stationary tank located above said trough and connected to the same, said tank being connected to a pressure-changing device whereby the water is alternately caused to occupy said tank and said trough, an overflow device for controlling the height of the water in said trough and means for maintaining the supply of water in said trough, substantially as described.

6. In a reversing valve the combination of a pair of oppositely disposed circular hollow heads, a hollow oval-shaped diaphragm connecting said heads, a hollow U shaped trough connecting said heads, said diaphragm projecting into said trough, a pipe connection to each head, and means whereby the trough may be alternately filled and emptied of water, the entire structure being constructed to withstand internal pressure and closed to the atmosphere, substantially as described.

7. In combination, an open hearth furnace, four air reversing valves, four gas reversing valves, each valve including two connected hollow heads, a hollow connecting trough, and means whereby four troughs may be emptied of water simultaneously while four troughs are being filled with water, said means including a single valve adapted to supply or release pressure on eight water tanks, one of which is connected to each trough, substantially as described.

Signed at Duluth, Minnesota, this 23rd day of June, 1916.

ARTHUR G. HATCH.

Witnesses:
 A. M. Gow,
 J. B. Clark.

Copies of this patent may be obtained for five cents each, by addressing the "Commissioner of Patents, Washington, D. C."